United States Patent [19]
Kontz

[11] 3,825,396
[45] July 23, 1974

[54] BLOW MOLD LATCHING MECHANISM INCLUDING A SAFETY FEATURE

[75] Inventor: Robert F. Kontz, Toledo, Ohio

[73] Assignee: Owens-Illinois, Inc., Toledo, Ohio

[22] Filed: Mar. 7, 1973

[21] Appl. No.: 338,899

[52] U.S. Cl...... 425/450 C, 292/113, 425/DIG. 205
[51] Int. Cl. .............................................. B29c 1/16
[58] Field of Search......... 425/450 C, 387 B, 326 B, 425/450 R, 242 B, 324 B, DIG. 205, DIG. 221, DIG. 222; 249/167, 168, 169, 166, 163; 164/341; 292/113, DIG. 219, DIG. 65

[56] References Cited
UNITED STATES PATENTS

| | | | |
|---|---|---|---|
| 2,903,740 | 9/1959 | Parfrey........................ | 425/387 B X |
| 3,297,348 | 1/1967 | Griffiths et al..................... | 292/113 |
| 3,323,173 | 6/1967 | Poyner........................ | 425/450 C X |
| 3,608,152 | 9/1971 | Fink et al..................... | 425/450 C X |
| 3,624,672 | 11/1971 | Spivy.............................. | 425/245 X |

Primary Examiner—J. Spencer Overholser
Assistant Examiner—David B. Smith
Attorney, Agent, or Firm—Philip M. Rice; E. J. Holler

[57] ABSTRACT

A mechanism for latching together the mold halves of a blow molding machine at their parting line includes a safety feature which prevents application of the latching force to the mold halves if a foreign object prevents closing of the molds. The latch actuating system is particularly adapted for use in a blowing operation wherein the mold halves swing toward and away from each other and reciprocate along axes parallel with the parison. The actuator comprises an elongated cam positioned to be engaged during the blowing cycle by a cam follower mounted on a latch actuating arm carried by one of the mold halves.

7 Claims, 11 Drawing Figures

BLOW MOLD LATCHING MECHANISM INCLUDING A SAFETY FEATURE

BACKGROUND OF INVENTION

The present invention is concerned with an improved latch and latch actuating mechanism, particularly suited for use in a blow molding machine of the type described in U.S. Pat. No. 3,652,751 to Criss and Pollitt, entitled "Method and Apparatus for Blow Molding Plastic Articles".

The blow molding machine therein described is of the type wherein the opposed halves of the blow mold swing toward and away from each other during opening and closing, like the pages of a book. Simultaneously, they continuously reciprocate along an axis parallel with that of the parison. The mold halves close on the parison and travel downwardly with it during the blowing operation. Near the end of their downward stroke, when the blowing is completed, the mold halves open and then reverse their direction of stroke and return in the open position to their starting point, where they again close on a new portion of the parison and repeat the cycle.

Such an environment presents several problems for effective latching and latch actuation. First, it is desirable that the latching elements be at the parting line of the molds, to provide maximum latching force for opposing the blowing forces and to avoid transmitting high mold separating forces to components of the mold carrier assembly.

Another aspect of an effective latching system is that the latching action be accomplished at high speed and that it be accurately synchronized with the swinging and reciprocating motions of the mold halves, so as not to prolong the blowing cycle.

Another requirement is that the latch actuator be compatible with a mold which is both swinging and reciprocating during the operation.

Still another requirement is that the mechanism include a safety feature which prevents application of full latching force in the event that an unejected blown article or other foreign object interferes with the normal closing of the mold halves.

A further requirement is that a reaction for the latching forces be provided to minimize any tendency to distort the molds or mold supporting structure.

These and other requirements and objects of the present invention will be further understood by reference to the accompanying specification and drawings.

DETAILED DESCRIPTION OF THE INVENTION

Figure 1:
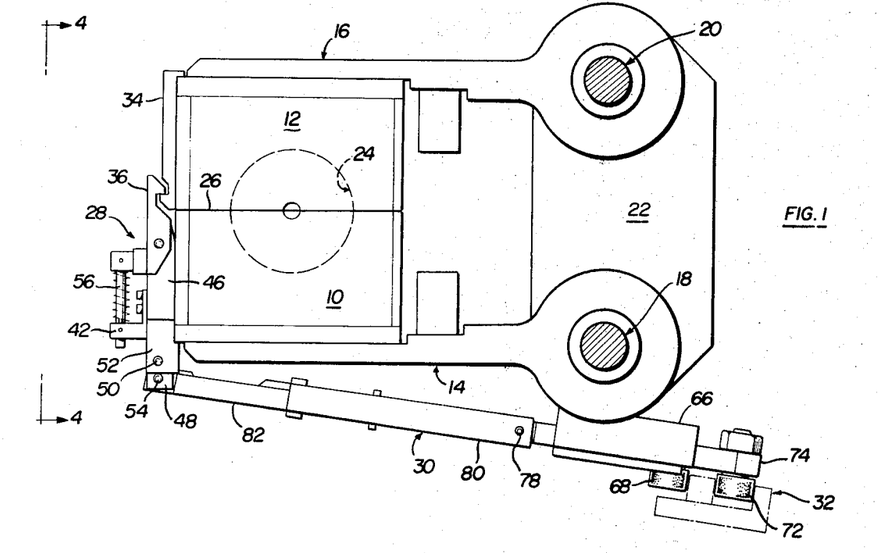
FIG. 1 is a plan view of the mold halves and latch actuating mechanism, shown in the closed and latched condition.
Figure 2:
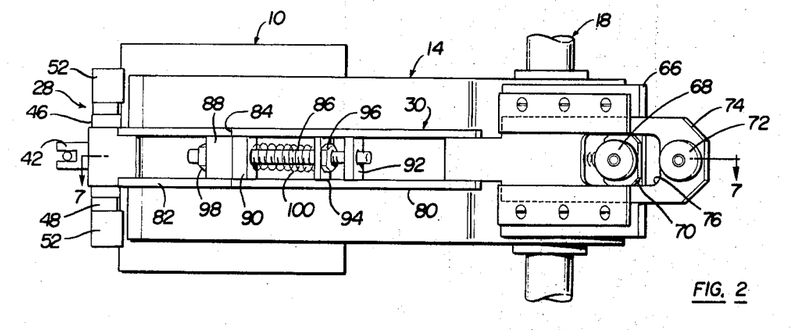
FIG. 2 is a side elevation of the mechanism of FIG. 1.
Figure 3:
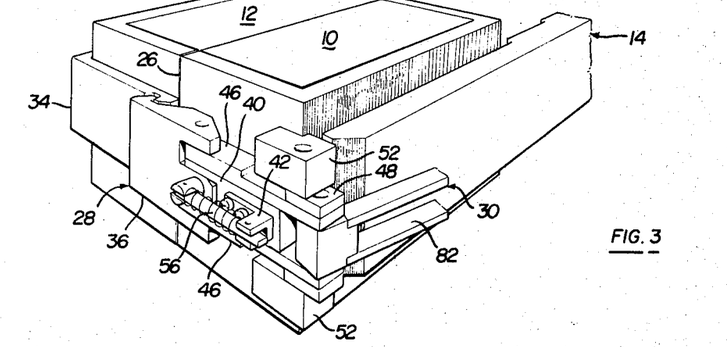
FIG. 3 is a perspective view of a portion of the mechanism shown in FIGS. 1 and 2.
Figure 4:
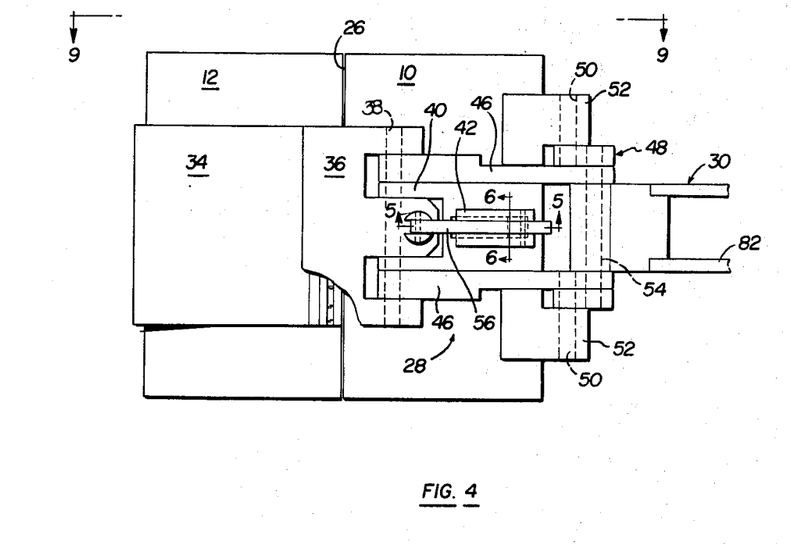
FIG. 4 is an end view of the mechanism of FIG. 1, viewed in the direction of arrows 4—4 of FIG. 1.
Figure 5:
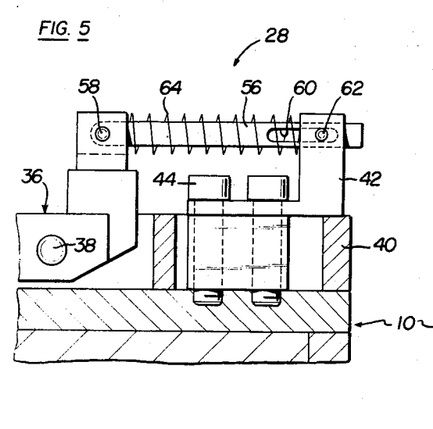
FIG. 5 is a section through a portion of the latching mechanism, viewed in the direction of arrows 5—5 of FIG. 4.
Figure 6:
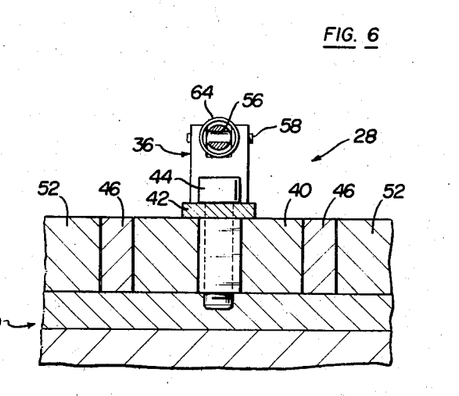
FIG. 6 is a section through another portion of the latching mechanism, viewed in the direction of arrows 6—6 of FIG. 4.

Referring first to FIGS. 1–3, in particular, a pair of mold halves 10, 12 are mounted on mold carrier arms 14, 16, respectively, for vertical reciprocation along and rotation with splined shafts 18, 20, respectively, which are rotatably mounted on base 22. That is, means not illustrated cause shafts 18 and 20 to swing toward and away from each other for closing and opening of mold halves 10 and 12 according to a predetermined sequence. Additional means not illustrated cause the mold carrier arms and mold halves to reciprocate along the length of the vertical splined shafts 18, 20. The swinging and reciprocating motions enable two sets of molds to be employed with a single parison, with one traveling downwardly during blowing while the other travels upwardly in open position, in hand-over-hand-fashion, as described in the above identified patent.

As shown in FIG. 1, the mold halves contain a blow mold cavity 24, and they meet at a parting line 26.

The apparatus further generally includes a latch assembly 28, latch actuating arm assembly 30 and cam assembly 32, each described below.

LATCH ASSEMBLY

The details and operation of the latch assembly 28 will be best understood by reference to FIGS. 3 through 6 and 9 through 11. The latch itself comprises a first latch member 34 which is fixedly mounted on mold half 12, and a second latch member 36 which is pivotally and slidably mounted on mold half 10. Specifically, latch member 36 pivots about a pivot pin 38 carried by U-shaped latch slide 40, which in turn slides toward and away from mold parting line 26. Latch slide 40 is retained and guided by latch slide guide 42 which passes upwardly through a slot 43 in slide 40 and has portions which bear upon the top face of slide 40 (see FIG. 6). Guide 42 is secured to mold half 10 by mounting screws 44.

Movement of latch member 36 and latch slide 40 is effected by a pair of latch connecting rods 46 which are pivotally connected at their forward ends to latch pivot pin 38 and at their rearward ends to a latch crank shaft 48. The ends 50 of crank shaft 48 are rotatably mounted in journal blocks 52 fixed to mold half 10 while the central portion 54 of crank shaft 48 rotatably carries connecting rods 46 and latch actuating arm assembly 30.

Movement of latch member 36 is further controlled by a control link 56 which has its forward end connected to latch member 36 by pivot pin 58. The opposite end of control link 56 is provided with a slot 60, which receives a pin 62 fixed to latch slide guide 42, and which permits link 56 to move longitudinally relative to slide guide 42. A compression spring 64 surrounds control link 56 and bears at its opposite ends against slide guide 42 and latch member 36.

LATCH ACTUATING ARM ASSEMBLY

The construction of latch actuating arm assembly 30 will be best understood by reference to FIGS. 1–3 and 7. The actuating arm assembly 30 is slidably mounted in guide block 66 secured to mold carrier arm 14. The left end of the arm assembly is pivotally mounted to the central portion 54 of latch crank shaft 48.

The righthand portion of actuator arm assembly 30 carries a fixed or reaction follow 68 rotatably mounted in reaction block 70 and a movable follower 72 rotatably mounted in a slide bar 74. Slide bar 74 contains a central slot 76 which enables it to slide longitudinally over the fixed reaction block 70 which is immovably bolted to guide block 66 by the threaded stud which carries the reaction follower 68. A compression spring 77 biases slide bar 74 toward the left with respect to reaction block 70.

The left end of slide bar 74 is pivotally mounted through pin 78 to a first portion 80 of the actuating arm. A second portion 82 of the actuating arm abuts first portion 80 at abutment line 84. Portions 80 and 82 are connected by means of a threaded stud 86 whose left end is threaded into a block 88 fixed to portion 82 of the arm. Stud 86 passes through a clearance hole in block 90 fixed to portion 80 of the arm and also passes through a clearance hole in guide block 92 fixed to portion 80 of the arm. A guide washer 94 is positioned on the threaded portion of stud 86 by a nut 96, and slidably engages portions of arm portion 80, for a purpose to be described below. A second nut 98 secures threaded stud 86 in place within block 88. A heavy compression spring 100 bears against block 90 fixed to arm portion 80 and against guide washer 94 fixed on stud 86. This structure interconnecting arm portions 80 and 82 provides a lost motion connection, the purpose and operation of which will be described below.

CAM ASSEMBLY

Figure 7:
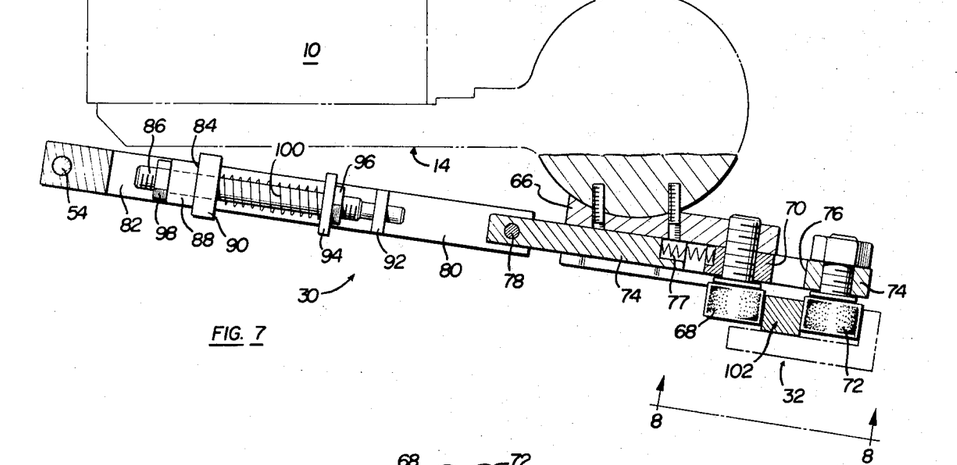
FIG. 7 is a view similar to FIG. 1, but on an enlarged scale, showing the latch actuation mechanism.
Figure 8:
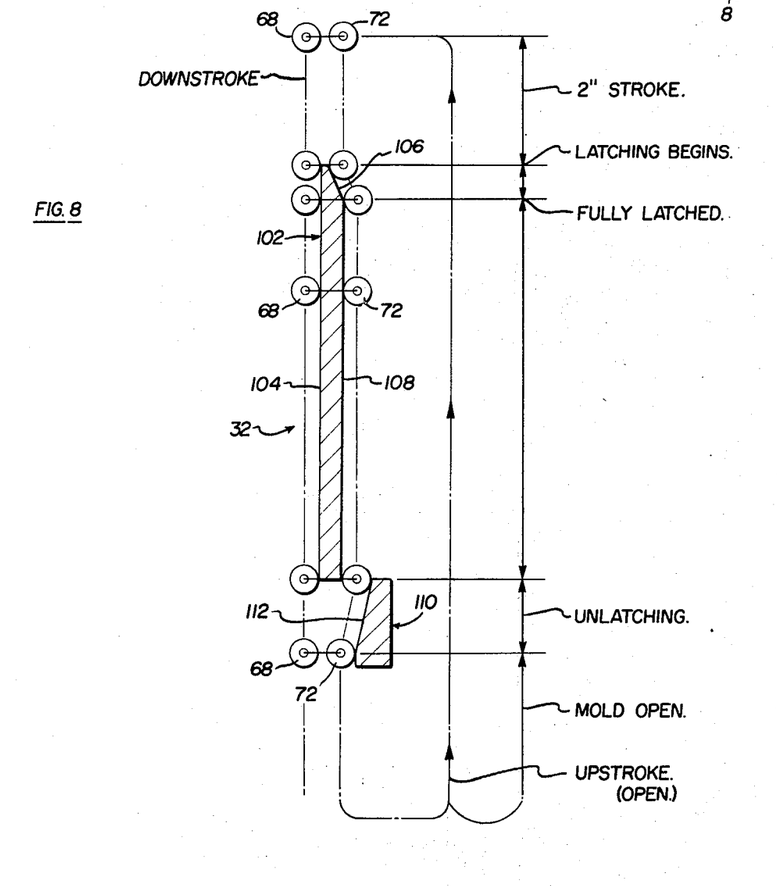
FIG. 8 is a partially schematic elevation of the cam portion of the latch actuating mechanism, viewed in the direction of arrows 8—8 of FIG. 7.

Referring to FIGS. 7 and 8, there is illustrated an elongated upper cam 102 arranged vertically and mounted on base 22 so as to be parallel with shafts 18 and 20. Upper cam 102 has a reaction face 104 along one side, which face is selectively engaged by reaction follower 68. Along the opposite side of upper cam 102 is a latching ramp 106 and a dwell portion 108. Below and slightly to one side of upper cam 102 is a lower cam 110 having an unlatching lamp 112. Cam portions 106, 108 and 112 are selectively engaged by the movable cam follower 72, in a manner to be described below.

OPERATION

The operation of the latching system of this invention will first be described with reference to FIGS. 1, 7 and 8. The operation will be explained beginning with the point at which the mold halves are in their fully opened position, at the top of their vertical stroke along shafts 18, 20, and ready to begin their downward stroke. As they start downward, they begin to close, closing being purposely delayed until the mold halves have reached the downward speed of the continuously extruded parison about which they will close. It will be appreciated from FIGS. 1 and 7 that latch actuating arm 30 is constrained to pivot with mold carrier arm 16. Thus, reaction follower 68 and movable follower 72 both swing along arcs about the axis of shaft 18. Necessarily, this lateral movement of the followers must occur at a time when they are not in engagement with cam assembly 32. Therefore, as illustrated in FIG. 8, the first two inches (for example) of the downward stroke occurs above the upper end of upper cam 102.

Prior to engagement with cam 102, followers 68 and 72 will be in their most closely spaced relative positions, under the influence of compression spring 77. When the downward stroke brings the followers into engagement with upper cam 102, latching ramp 106 will slowly cam movable follower 72 to the right, thus initiating the latching portion of the operation.

Rightward movement of follower 72 carries with it slide bar 74, against the compression of spring 77, which movement in turn causes rightward movement of the entire latch actuating arm assembly 30.

Figure 9:
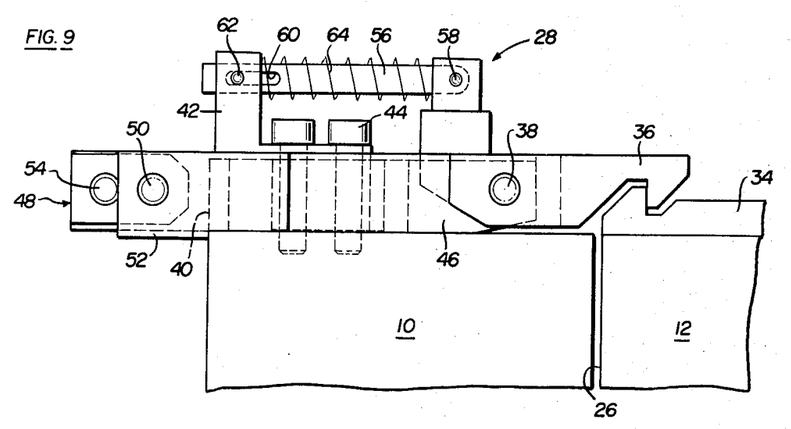
FIGS. 9 to 11 are enlarged views of the latch mechanism of FIG. 1, showing in sequence, respectively, the latch position, the unlatched position, and the position wherein the latching stroke has been completed but a foreign object has prevented closing of the molds.
Figure 10:
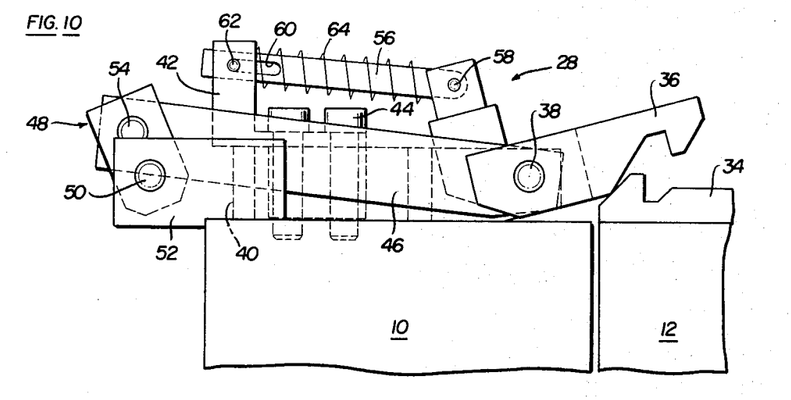

At the beginning of the latching phase, the mold half swinging mechanism (unillustrated) will have brought the mold halves into close but slightly spaced proximity to each other, and the latching mechanism will be in its released position as shown in FIG. 10. Rightward movement of latch actuating arm assembly 30 (as viewed in FIG. 1), causes rotation of latch crank shaft 48 about its ends 50, causing central portion 54 of the crank shaft to rotate counterclockwise about ends 50, from the position shown in FIG. 10 toward the position shown in FIG. 9. This arcuate path causes latch connecting rods 46 to travel toward the left as they pivot downwardly (as viewed in FIG. 10), thus carrying latch side 40, latch pivot pin 38 and latch member 36 all with it toward the left.

Latch member 36 is shaped like a bell crank, with the upper leg (which carries pivot pin 56) being continuously biased by compression spring 64 in a clockwise direction about pivot pin 38. Therefore, any leftward movement of latch member 36 from the position shown in FIG. 10 tends to further compress spring 64, causing latch member 36 to be rotated clockwise about pin 38. Latch member 36 continues to move clockwise until it engages fixed latch member 34. Thereupon, continued leftward movement of the latching assembly pulls mold half 12 towards mold half 10. This final latching motion, which is unaccompanied by any further rotation of latch member 36, is made possible by slot 60 in latch controlling link 56, which slot provides a lost motion connection between latch member 36, link 56 and latch slide guide 42.

FIG. 9 illustrates the latch assembly 28 in its fully latched position. At this point, the mold halves have travelled downwardly sufficiently to bring follower 72 onto the upper end of cam dwell portion 108, as shown in FIG. 8.

The latch assembly remains in its latched condition of FIG. 9 during continued downward movement of the mold halves, while cam follower 72 rides along dwell portion 108 of upper cam 102. This is the blowing phase of the molding operation. Once the blowing operation is completed, the latch may be released. This is accomplished by terminating the dwell portion 108 of upper cam 102, thus allowing follower 72, and therefore, actuating arm 30, to return toward the left, under the influence of compression spring 77. However, to assure positive unlatching at the necessary time, a lower cam portion 110 is provided with a reversely inclined unlatching ramp 112 which positively forces follower 72 toward the left.

Referring once again to FIGS. 9 and 10, during unlatching, crankshaft 48 pivots clockwise about its end portions 50, causing connecting rods 46, latch slide 40 and pivot pin 38 to stroke toward the right. As shown in FIG. 9, there is only a small portion of the slot 60 in latch control link 56 available to absorb free movement of latch member 36 and control link 56 toward the right. Once this initial portion of the stroke is consumed, any further rightward movement of latch pivot pin 38 causes latch member 36 to pivot counterclockwise, because pivot pin 58 has reached the limit of its rightward stroke. The combination of the rightward stroke of latch member 36 and its counterclockwise pivoting releases latch member 34, allowing the mold halves to swing apart under the influence of the appropriate drive mechanism (unillustrated).

At this point in the cycle, the mold halves are unlatched and are opening during the final portion of the downward stroke. It is during this portion that the blown article is ejected from the mold halves. As soon as followers 68 and 72 have travelled beyond the lower end of lower cam 110, mold half 10 is free to swing about shaft 18, with the followers thus being out of the path of the cams. The mold halves then travel upwardly while remaining in their fully open positions until they get to the top of their stroke, at which point the above described cycle repeats itself.

Figure 11:
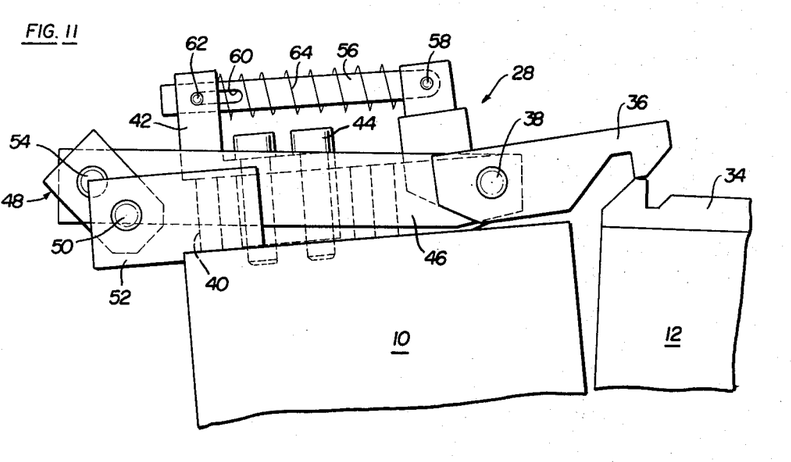

In the event that a blown article is not fully ejected from the mold halves, or some foreign object prevents their normal closing the latching mechanism of the present invention will absorb the latching stroke without applying possibly damaging forces to the mold halves. This condition is illustrated in FIG. 11 where it will be apparent that latching member 36 has hung up on the outer portion of latching member 34, as would occur if a foreign objected prevented mold halves 10 and 12 from coming within the usual prelatching proximity to each other. This interference prevents latch member 36 from fully pivoting in the clockwise direction about pivot pin 38. Thus, the leftward stroke of pivot pin 38 during the latching operation will result in a less than normal distance between pins 58 and 62. However, slot 60 in latch control link 56 is capable of absorbing this motion, thus enabling latch member 36 to remain in its only partially pivoted position during such an abortive latching operation. In this way, no latching forces are applied to the mold halves against the resistance of the foreign object.

Another safety feature in the form of a lost motion device, illustrated in FIGS. 2 and 7, interconnects the two portions 80 and 82 of the actuating arm assembly 30. The purpose of this device is to assure that the latch-engaging stroke of actuating arm assembly 30 is long enough to assure full latching, without the danger of possible overstroking of the arm beyond that which fully closes the mold halves. In fact, a slight excess travel is preferably designed into cam assembly 32, to assure full closing of the mold halves.

The two portions 80 and 82 of the actuating arm assembly are continuously biased against each other in a longitudinal direction by heavy compression spring 100. The left end of compression spring 100 is bottomed on block 90 fixed to arm portion 80, while the right end of the spring is continuously forcing block 88 of arm portion 82 to the right against block 90 by reason of the spring force exerted against guide washer 94 interconnected to arm portion 82 by stud 86.

When, during the latch engaging operation, the mold halves become fully closed and thereby prevent further rightward stroking of arm portion 82, the continued stroke of arm portion 80 under the influence of cam 32 is absorbed by compression spring 100. That is, rightward movement of arm portion 80 carries with it block 90, but since arm portion 82 and therefore guide washer 94 are stationary, the longitudinal distance between block 90 and guide washer 94 decreases, as permitted by spring 100. Stud 86 freely advances through the clearance holes provided in guide washer 94 and guide block 92. In a preferred embodiment of the present invention, the excess stroke may amount to 0.010–0.015 inches, which appears as a gap of that amount opening up between blocks 88 and 90.

The arrangement and construction of the actuating arm assembly minimizes the application of latching forces to the mold and mold supporting structure, which forces could tend to twist such structure about the five-foot long splined shafts 18, 20. The short lever arm from arm assembly 30 to shaft 18 minimizes such twisting. Also, the engagement of reaction follower 68 against reaction face 104 of upper cam 102 provides a continuous reaction for such latching forces.

This invention may be further developed within the scope of the following claims. Accordingly, the above specification is to be interpreted as illustrative of only a single operative embodiment of the present invention, rather than in a strictly limited sense.

I now claim:

1. In a blow molding machine having opposed blow mold halves pivotally mounted to swing between open and closed positions, the improved latching system for releaseably latching the mold halves together at their parting line, comprising:

first and second latch members mounted on the respective mold halves and positioned so that the opposed latching portions thereof may selectively engage and interlock with each other when the mold halves are positioned in a substantially closed position;

said second latch member being mounted to pivot about a first pivot pin which is slidably mounted on said second mold half and which is constrained to slide on said second mold half in a straight path toward and away from said first latch member;

latch actuating means connected to said first pivot pin to selectively cause said first pivot pin to slide along said path between latch releasing and latch engaging positions;

latch pivoting means connected to said second latch member to selectively cause said second latch member to pivot about said first pivot pin;

said latch actuating means being operable, during the latch engagement phase, to cause said first pivot pin to slide away from said first latch member to a latch engaging position, initial movement of said first pivot pin also causing said latch pivoting means to pivot said second latch member about said first pivot pin in a first direction to bring said opposed latching portions into engageable alignment, whereupon continued movement of said first pivot pin causes said latching portions to engage and interlock, the final portion of the stroke of said pivot pin toward its latch engaging position causing said second latch member to pull said first latching member and said first mold half tightly against said second mold half;

said latch actuating means being operable, during the latch release phase to cause said first pivot pin to slide along said path towards said first latch member to its latch releasing position, said latch pivoting means being responsive to an initial predetermined sliding movement of said first pivot pin to cause said second latch member to pivot about said first pivot pin in the direction opposite the said first direction to place said latching portions out of engageable alignment with each other to release the latching system and to enable the mold halves to be fully opened.

2. The latching system of claim 1 wherein said latch pivoting means comprises spring means continuously biasing said second latch member in said first direction towards its engaged position, and wherein said latch pivoting means further comprises a positive force-applying member positioned to cause said second latch member to pivot in the direction opposite the said first direction against the biasing force of said spring means to assume its released position whenever said latch actuating means has caused said first pivot pin to travel at least a predetermined distance from its latch engaging position towards its latch releasing position.

3. The latching system of claim 2 wherein said positive force-applying member comprises a link interconnecting a portion of said second latch member with said second mold half.

4. In a blow molding machine having opposed blow mold halves pivotally mounted to swing between open and closed positions, the improved latching system for releaseably latching the mold halves together at their parting line, comprising:
first and second latch members mounted on the respective mold halves and positioned so that the opposed latching portions thereof may selectively engage and interlock with each other when the mold halves are positioned in a substantially closed position;
said second latch member being in the form of a bell crank mounted to pivot about a first pivot pin which is slidably mounted on said second mold half and which is constrained to slide on said second mold half in a straight path toward and away from said first latch member;
latch actuating means connected to said first pivot pin to selectively cause said first pivot pin to slide along said path between latch releasing and latch engaging positions;
latch pivoting means connected to a first leg of said second latch member bell crank to selectively cause said second latch member to pivot about said first pivot pin, said latch pivoting means comprising a spring continuously biasing said second latch member in a first direction to bring said opposed latching portions into engageable alignment, and said latch pivoting means further comprising a link pivotally connected at one end by a second pivot pin to said first leg and pivotally connected at its opposite end to the second mold half by a lost motion connection which allows said link to move longitudinally a predetermined distance relative to the second mold half, said link being substantially parallel with said sliding path of said first pivot pin;

said latch actuating means being operable, during the latch engagement phase, to cause said first pivot pin to slide away from said first latch member to a latch engaging position, the latch engaging stroke of said first pivot pin causing said second latch member and said link to also slide as permitted by said lost motion connection, said spring simultaneously causing said second latch member to pivot about said first pivot pin in said first direction to engage and interlock said latch members, continued subsequent sliding movement of said first pivot pin causing said second latch member to pull said first latch member and the first mold half toward and into tightly closed abutment with the second mold half;

said latch actuating means being operable during the latch release phase to cause said first pivot pin to slide towards said first latch member, the initial stroke of said first pin consuming the predetermined lost motion distance, thereby terminating the longitudinal travel of said second pivot pin, with subsequent travel of said first pivot pin causing said second latch member to pivot about said first pivot in the direction opposite the said first direction as said first leg simultaneously pivots about said second pivot pin, thereby placing said latching portions out of engageable alignment with each other to release the latching system and to enable the mold halves to be fully opened.

5. The latching system of claim 4 wherein said lost motion connection enables said link and said second latch member to stroke away from said first latch member during the engagement phase, against the compression of the spring, without the initial pivoting of said second latch member in said first direction, when said pivotal movement is prevented by the presence of a foreign object which prevents normal closing of the mold halves and normal engagement of said first and second latch members.

6. In a blow molding machine wherein the blow mold halves are pivotally mounted to swing toward and away from each other for closing and opening and also reciprocate along axes parallel with the axis of the parison during the blowing operation, and wherein the blow mold halves initially close on the parison and stroke in a first direction during blowing, then open during the final portion of said stroke and then return to said initial position while maintaining their open condition, the improved latch actuator for actuating a mold latch element positioned on one of the mold halves and for coordinating such actuation with the position of the mold halves along their stroke, comprising:
a latch actuating arm mounted on said one mold half and having a first end connected to the mold latch element and a second end provided with a cam follower, said arm being so mounted on said one mold half as to be constrained to both swing and reciprocate with said mold half also being capable of sliding movement relative to said mold half between latch engaging and latch releasing positions;
arm biasing means for resiliently biasing said arm toward its latch releasing position;
an elongated cam fixed with respect to said machine and having its longitudinal axis parallel with said axis of reciprocation of said mold halves and positioned to establish operative engagement with said cam follower during a portion of the blowing stroke of said mold halves, the length and contour of said cam being such as to cause said arm to move to its latch engaging position during the initial portion of the blowing stroke of the mold halves and to remain in such position until near the end of the blowing stroke, whereupon said cam and said arm biasing means cause said arm to return to its latch releasing position during the final portion of said blowing stroke and to remain in such position throughout the entire return stroke of said mold halves.

7. The latch actuator of claim 6 wherein said latch actuating arm is provided with a reaction member which is fixed and non-slidably mounted with respect to said one mold half, said reaction member being positioned to engage said cam whenever said cam follower engages said cam so that said cam and said reaction member provide a reaction force which opposes the latch actuating forces applied to said mold half and its supporting structure.

* * * * *

PO-1050
(5/69)

UNITED STATES PATENT OFFICE
CERTIFICATE OF CORRECTION

Patent No. 3,825,396              Dated July 23, 1974

Inventor(s) Robert F. Kontz

It is certified that error appears in the above-identified patent and that said Letters Patent are hereby corrected as shown below:

In Column 8, line 59, the word --while-- should appear after "half."

Signed and sealed this 5th day of November 1974.

(SEAL)
Attest:

McCOY M. GIBSON JR.
Attesting Officer

C. MARSHALL DANN
Commissioner of Patents